(12) United States Patent
Sagarwala et al.

(10) Patent No.: US 9,031,095 B2
(45) Date of Patent: *May 12, 2015

(54) PRECISION TIMING USING A MODIFIED SYNCHRONIZATION OPERATION

(71) Applicants: Muhammad Sagarwala, Los Gatos, CA (US); John Johnson, Los Altos, CA (US)

(72) Inventors: Muhammad Sagarwala, Los Gatos, CA (US); John Johnson, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/914,130

(22) Filed: Jun. 10, 2013

(65) Prior Publication Data

US 2013/0272322 A1 Oct. 17, 2013

Related U.S. Application Data

(63) Continuation of application No. 13/030,566, filed on Feb. 18, 2011, now Pat. No. 8,462,821.

(51) Int. Cl.
*H04J 3/06* (2006.01)
(52) U.S. Cl.
CPC ............ *H04J 3/0658* (2013.01); *H04J 3/0667* (2013.01)
(58) Field of Classification Search
USPC ................................................. 370/503–508
See application file for complete search history.

(56) References Cited

U.S. PATENT DOCUMENTS

| 8,462,821 B1* | 6/2013 | Sagarwala et al. | 370/508 |
| 2004/0062280 A1* | 4/2004 | Jeske et al. | 370/517 |
| 2009/0040920 A1* | 2/2009 | Malekpour | 370/216 |
| 2011/0051754 A1* | 3/2011 | Lansdowne | 370/503 |

OTHER PUBLICATIONS

Co-pending U.S. Appl. No. 13/030,566, filed Feb. 18, 2011 entitled "Precision Timing Using a Modified Synchronization Operation" by Muhammad Sagarwala et al., 60 pages.
The Institute of Electrical and Electronics Engineers, Inc., "IEEE Standard for a Precision Clock Synchronization Protocol for Networked Measurement and Control Systems," IEEE Std 1588™-2008 (Revision of IEEE Std 1588-2002), Jul. 24, 2008, pp. 1-289.

* cited by examiner

*Primary Examiner* — Phuc Tran
(74) *Attorney, Agent, or Firm* — Harrity & Harrity, LLP

(57) ABSTRACT

A master node is configured to receive, from a slave node, a request to perform a modified two-step synchronization (sync) operation in a manner that precludes transmitting a follow-up packet; generate a sync packet in a manner that includes information associated with a previous time that a prior sync packet was transmitted to the slave node; transmit the sync packet to the slave node; receive, from the slave node, a delay request packet; transmit, to the slave node, a delay response packet, where the delay response packet stores information associated with another time at which the delay request packet was received, and where transmitting the delay response packet enables the slave node to calibrate a clock, hosted by the slave node, to a master clock, hosted by the master node, based on the previous time and the other time.

20 Claims, 8 Drawing Sheets

US 9,031,095 B2

PRECISION TIMING USING A MODIFIED SYNCHRONIZATION OPERATION

RELATED APPLICATION

This application is a continuation of U.S. patent application Ser. No. 13/030,566, filed Feb. 18, 2011, the disclosure of which is incorporated herein by reference.

BACKGROUND

Computing and communication networks typically include nodes, such as routers, firewalls, switches or gateways, which transfer or switch data, such as packets, from one or more sources to one or more destinations. The nodes may operate on the packets as the packets traverse the network, such as by forwarding or filtering the packet-based network traffic.

A master node may provide timing and control services to other nodes (referred to as slave nodes) by transmitting and/or receiving timing packets that permit the slave nodes to synchronize clocks, hosted by the slave nodes, to a master clock that is hosted by the master node. The slave nodes may use the timing packets to identify a period of delay and/or error associated with the clocks relative to the master clock. The slave nodes may use the period of delay and/or error to calibrate the clocks to the master clock.

A master node may transmit a particular timing packet, such as a synchronization packet, to a slave node that includes a particular time, calibrated to the master clock, at which the synchronization packet was transmitted. The slave node may receive the synchronization packet and may use the particular time to synchronize with the master clock. The master node may be a one-step master when the particular time is stored in the synchronization packet. The master node may be a two-step master when the particular time is transmitted, to the slave node via a follow-up packet, after the synchronization packet is sent.

SUMMARY

According to one aspect, a method, performed by a master node, may include receiving, by the master node and from a slave node, a packet associated with a request to perform a modified two-step synchronization (sync) operation in a manner that precludes transmitting a follow-up packet, where the operation may permit the slave node to calibrate a clock, hosted by the slave node, to the master clock hosted by the master node; and generating, by the master node and in response to the request, a sync packet in a manner that includes information associated with a prior point in time that a prior sync packet was transmitted to the slave node. The method may also include transmitting, by the master node, the sync packet to the slave node, where transmitting the sync packet may enable the slave node to determine a quantity of delay associated with traffic that is being transported from the master node to the slave node based on the prior point in time and a time at which the sync packet was received by the slave node; and receiving, by the master node and from the slave node, a delay request packet. The method may further include transmitting, by the master node and to the slave node, a delay response packet in response to the delay request packet, where the delay response packet may store information associated with another time at which the delay request packet was received by the master node, and where transmitting the delay response packet enables the slave node to determine another quantity of delay associated with traffic that is being transported from the slave node to the master node based on the other point in time and a further time at which the delay request packet was transmitted, to the master node, by the slave node.

According to another aspect, a master node, that hosts a master clock, may include a processor to receive, from a slave node that hosts a clock, a packet associated with a request to perform a modified two-step synchronization (sync) operation in a manner that precludes transmitting a delay response packet, where the operation may permit the slave node to calibrate the clock to the master clock; transmit, to the slave node and in response to the request, another packet that indicates that the modified two-step sync operation is to be performed; and receive, from the slave node, a delay request packet. The processor may also transmit, in response to the delay request packet, a sync packet to the slave node in response to the delay request packet; generate a follow-up packet associated with the sync packet, where the follow-up packet may include a timestamp associated with a time at which the sync packet was transmitted, and another timestamp associated with another time at which the delay request packet was received; and transmit the follow-up packet to the slave node, which enables the slave node to calibrate the clock to the master clock based on the timestamp and the other timestamp.

According to still another aspect, a non-transitory computer-readable medium, containing one or more instructions executable by at least one processor, may include instructions to receive, from a slave node, a packet associated with a request to perform a first two-step synchronization (sync) operation, a second two-step sync operation, or a third two-step sync operation, where performing the first, second, or third two-step sync operations may enable a clock, hosted by the slave node, to be calibrated to a master clock. The non-transitory computer readable medium may further include instructions to perform the first sync operation based on a determination that the packet includes a request to perform the first sync operation, where the first sync operation may be a standard two-step synchronization operation that includes transmitting, to the slave node, a sync packet, a follow-up packet, and a delay response packet. The non-transitory computer-readable medium may also include instructions to perform the second sync operation based on a determination that the packet includes a request to perform the second sync operation, where the second sync operation may be a modified two-step sync operation that includes transmitting, to the slave device, the sync packet and the delay response packet. The non-transitory computer-readable medium may still further include instructions to perform the third sync operation based on a determination that the packet includes a request to perform the third sync operation, where the third sync operation may be the other modified two-step sync operation that includes transmitting, to the slave device, the sync packet and the follow-up packet.

According to a further aspect, a master node, that hosts a master clock may include a processor to receive, from a slave node, a packet associated with a request to perform a modified two-step sync operation or a modified one-step sync operation, where performing the modified two-step sync operation or the modified one-step sync operation may enable a clock, hosted by the slave node, to be calibrated to the master clock. The processor may also perform the modified two-step sync operation based on a determination that the packet includes a request to perform the modified two-step sync operation, where the modified two-step sync operation may be performed in a manner that precludes sending, to the slave node, a delay response packet or a follow-up packet, and may include transmitting a modified sync packet to the slave node. The modified sync packet may include information associated with a prior time when a prior sync packet was transmitted to the slave node and information associated with a time when a delay request packet was received from the slave node. The processor may further perform the modified one-step sync operation based on a determination that the packet includes a request to perform the modified one-step sync operation, where the modified one-step sync operation may be performed in a manner that precludes transmitting, to the slave node, the delay response packet or the follow-up packet, and may include transmitting, to the slave node, another modified sync packet. The other modified sync packet may include information associated with another time when the other modified sync packet is transmitted to the slave node and the information associated with the time when the delay request packet was received.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
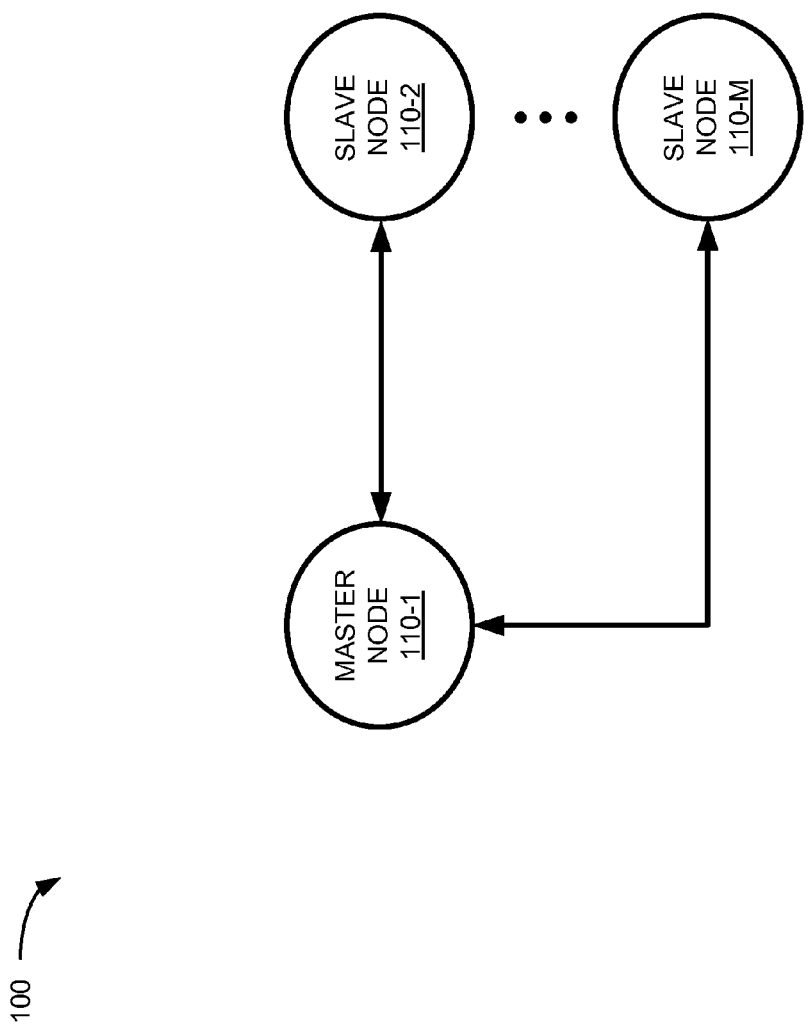
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may enable a master node, that hosts a master clock, to perform a two-step synchronization operation (hereinafter referred to as a "modified two-step synchronization operation") with a slave node in a manner that reduces a quantity of packets, bandwidth, and/or processing capacity associated with performing a standard two-step synchronization operation. The term "master clock," as used herein, may be a clock (e.g., hosted by a master node) by which a clock, hosted by the slave node, is calibrated and/or synchronized via a standard two-step synchronization operation or a modified two-step synchronization operation.

As described, a master node may perform a standard two-step synchronization operation in a manner that includes transmitting a synchronization packet (hereinafter referred to as a "sync packet") to a slave node. The term "sync packet," as used herein, may be a packet, transmitted by the master node, that indicates that a synchronization operation is to be performed to identify a quantity of delay associated with traffic traveling between the master node and the slave node. The master node may transmit, to the slave node, a follow-up packet that includes a sync timestamp, associated with the sync packet, that identifies a point in time that the sync packet was transmitted by the master node. The slave node may use the sync timestamp and a time at which the sync packet was received to determine a quantity of delay associated with a network path over which traffic is transported from the master node to the slave node.

The slave node may transmit, to the master node, a delay request packet and the master node may receive the delay request packet. The master node may, in response to the delay request packet, transmit a delay response packet that identifies a time at which the delay request packet was received by the master node. The slave node may use the time at which the delay request packet was received and another time at which the delay request packet was transmitted to determine another quantity of delay associated with another network path over which traffic is transported from the slave node to the master node. Identifying the quantity of delay associated with the network path and/or the other quantity of delay associated with the other network path may enable the clock, hosted by the slave node, to be calibrated and/or synchronized relative to the master clock hosted by the master node. The master node may, in one example, perform the standard two-step synchronization operation based on an Institute of Electrical and Electronics Engineers (IEEE) 1588 Precision Timing (PTP) Standard).

As also described herein, the master node may perform a standard one-step synchronization operation. The master node may store, in a sync packet, a time at which the sync packet is transmitted to the slave node in a manner that does not include the follow-on packet associated with the two-step synchronization operation described above. The master node may, in one example, perform the standard two-step synchronization operation and/or the standard one-step synchronization operation based on an Institute of Electrical and Electronics Engineers (IEEE) 1588 Precision Timing (PTP) Standard).

As further described herein, a master node may perform a modified two-step synchronization operation in a manner that does not include sending a follow-up packet. The master node may perform the two-step synchronization operation by generating a sync packet to be sent to a slave node. The master node may cause a sync timestamp, associated with a prior point in time at which a previous sync packet was transmitted, to be stored in and/or appended to the sync packet. The master node may transmit the sync timestamp to the slave node, via the sync packet, rather than via a follow-up packet associated with the previous sync packet.

In another example implementation, the master node may perform the modified two-step synchronization operation in a manner that does not include sending a delay response packet. The master node may store, in the sync packet, a time at which a delay request packet was received by the master node. In this example, the sync packet may include the sync timestamp and/or a time at which the delay request packet was received. The master node may send the sync packet to the slave node in a manner that does not include sending packet delay response packet. Performing the modified two-step synchronization operation in a manner that does not include transmitting the follow-up packet and/or the delay response packet may reduce a quantity packets being processed while performing a synchronization operation and/or may reduce a quantity of processing capacity and/or bandwidth that is utilized in order to perform the synchronization operation.

As yet further described herein, a master node may use a modified follow-on packet to perform another modified two-step synchronization operation in a manner that does not include sending a delay response packet. The master node may, for example, receive a delay request packet from the slave node and may temporarily store a time at which the delay request packet was received. The master node may use a follow-up packet, associated with a sync packet that was transmitted to the slave node, to respond to the delay request packet. The master node may append to and/or store, in the follow-up packet, the time at which the delay request packet was received and may transmit the follow-up packet to the slave node in response to the delay request packet.

In another example implementation, the master node may use a modified sync packet to perform the other modified two-step synchronization operation in a manner that does not include sending a delay response packet. For example, the master node may store in the sync packet, a time at which a delay request packet was received by the master node. In this example, the sync packet may include the sync timestamp (e.g., associated with a previous sync packet) and/or the time at which the delay request packet was received. The master node may send the sync packet to the slave node in a manner that does not include sending the follow-up packet or the delay response packet.

Performing the other modified two-step synchronization operation in the manner that does not include the delay response packet may reduce a quantity packets being processed while performing synchronization operations and/or may reduce a quantity of processing capacity and/or bandwidth that is utilized by the master network node and/or the one or more slave network nodes.

As also described herein, a master node may perform modified one-step synchronization operation by using a sync packet to respond to a delay request packet received from a slave node. The master node may, for example, receive a delay request packet from the slave node and may append to and/or store in the sync packet, a time at which the delay request packet was received. The master node may transmit the sync packet to the slave node in response to the delay request packet. Performing the modified one-step synchronization operation in the manner that does not include the delay response packet may reduce a quantity packets being processed while performing synchronization operations and/or may reduce a quantity of processing capacity and/or bandwidth that is utilized by the master network node and/or the one or more slave network nodes.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

FIG. 1 is a diagram of an example network 100 in which systems and/or methods described herein may be implemented. As shown in FIG. 1, network 100 may include a group of network nodes 110-1, ..., 110-M (where M≥1) (hereinafter referred to collectively as "nodes 110" and individually as "node 110"). The number of nodes, illustrated in FIG. 1, is provided for explanatory purposes only. In practice, there may be additional nodes, fewer nodes, different nodes, or differently arranged nodes than illustrated in FIG. 1. Also, in some implementations, one or more of the nodes of network 100 may perform one or more functions described as being performed by another one or more of the nodes of network 100. The nodes of network 100 may interconnect via wired connections, wireless connections, or a combination of wired and wireless connections.

Node 110 may include a network device that transmits traffic (e.g., packets). For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables, packet forwarding tables, and/or multicast forwarding tables. Node 110 may receive, process, and/or transmit packets traversing network 100. Node 110 may add and/or append (push) information (e.g., headers, trailers, tags, etc.) to incoming and/or outgoing packets. Node 110 may remove and/or extract information from incoming and/or outgoing packets.

Node 110 may act as a master node 110 (e.g., node 110-1) and may host a master clock that is used, by master node 110, to perform synchronization operations associated with one or more slave nodes 110 (e.g., nodes 110-2, ..., 110-M). Slave nodes 110 may each host a clock that is calibrated and/or synchronized based on the master clock hosted by master node 110.

In one example implementation, master node 110 may perform a standard two-step synchronization operation (e.g., based on an IEEE 1588 PTP Standard and/or some other standard). The standard two-step synchronization operation may include transmitting a sync packet to one or more slave nodes 110 to initiate the standard two-step synchronization operation. Master node 110 may transmit a follow-up packet, associated with the sync packet that includes a sync timestamp associated with a time that the sync packet was transmitted. Master node 110 may, while performing the standard two-step synchronization operation, receive a delay request packet from the one or more slave nodes 110 and may, in response to the delay request, transmit a delay response packet. The delay response packet may store a delay timestamp associated with another time that the delay request packet was received.

In another example implementation, master node 110 may perform a standard one-step synchronization operation (e.g., based on an IEEE 1588 PTP Standard and/or some other standard). The standard one-step synchronization operation may include transmitting a sync packet to one or more slave nodes 110 to initiate the standard one-step synchronization operation. Master node 110 may transmit the sync packet in a manner that includes a sync timestamp that corresponds to a time at which the sync packet is transmitted. Master node 110 may, while performing the standard one-step synchronization operation, receive a delay request packet from the one or more slave nodes 110 and may, in response to the delay request, transmit a delay response packet in the manner described above.

In yet another example implementation, master node 110 may perform a modified two-step synchronization operation in a manner that does not include transmitting the follow-up packet. Master node 110, when performing the modified two-step synchronization operation, may transmit a sync packet to the one or more slave nodes 110. Master node 110 may cause a sync timestamp, associated with the sync packet, to be stored in and/or appended to another sync packet that is sent after the sync packet. In another example, master node 110 may cause the sync timestamp and/or information associated with the follow-up packet to be stored in and/or appended to the other sync packet.

In another example, master node 110 may, when performing the modified two-step synchronization operation, receive a delay request packet. Master node 110 may store a delay timestamp, associated with the delay request packet, in the other sync packet instead of or in addition to the sync timestamp. Master node 110 may transmit the other sync packet (e.g., that stores the sync timestamp and the delay timestamp) to slave node 110 in a manner that does not include transmitting the follow-on packet and/or a delay response packet.

In a further example implementation, master node 110 may perform another modified two-step synchronization operation in a manner that does not include transmitting a delay response packet. Master node 110, when performing the other modified two-step synchronization operation, may receive a delay request packet from the one or more slave nodes 110 and may cause a delay timestamp, associated with the delay request packet, to be stored in and/or appended to a follow-up packet that is associated with a previous sync packet. In another example, master node 110 may cause information associated with the delayed response packet (e.g., that includes the delay timestamp, a sequence number, etc.) to be stored in and/or appended to the follow-up packet before being transmitted to slave node 110.

In another example implementation, master node 110 may perform a modified one-step synchronization operation in a manner that does not include transmitting a delay response packet. Master node 110, when performing the modified one-step synchronization operation, may receive a delay request packet from the one or more slave nodes 110 and may cause a delay timestamp, associated with the delay request packet, to be stored in and/or appended to a sync packet that is to be transmitted to slave node 110. In another example, master node 110 may cause information associated with the delayed response packet (e.g., that includes the delay timestamp, a sequence number, etc.) to be stored in and/or appended to the sync packet.

Slave node 110 (e.g., nodes 110-2, . . . , 110-M) may perform operations associated with standard and/or modified two-step synchronization operations. For example, slave node 110 may determine a quantity of delay associated with traffic being transmitted on a network path from master node 110 to slave node 110 based on the sync timestamp and a sync receive timestamp that corresponds to a point in time that the sync packet was receive from master node 110. Slave node 110 may use the sync time stamp and/or the sync receive timestamp to determine the quantity of delay associated with the network path.

In another example, slave node 110 may determine another quantity of delay associated with traffic being transmitted on another network path from slave node 110 to master node 110 based on the delay timestamp that corresponds to a point in time that the delay request packet was transmitted to master node 110 and a delay receive timestamp was received. Slave node 110 may use the delay time stamp and/or the delay receive timestamp to determine the quantity of delay associated with the other network path. Slave node 110 may use the delay associated with the network path and the delay associated with the other network path to determine an offset, relative to the master clock, by which the clock may use to correct time.

Figure 2:
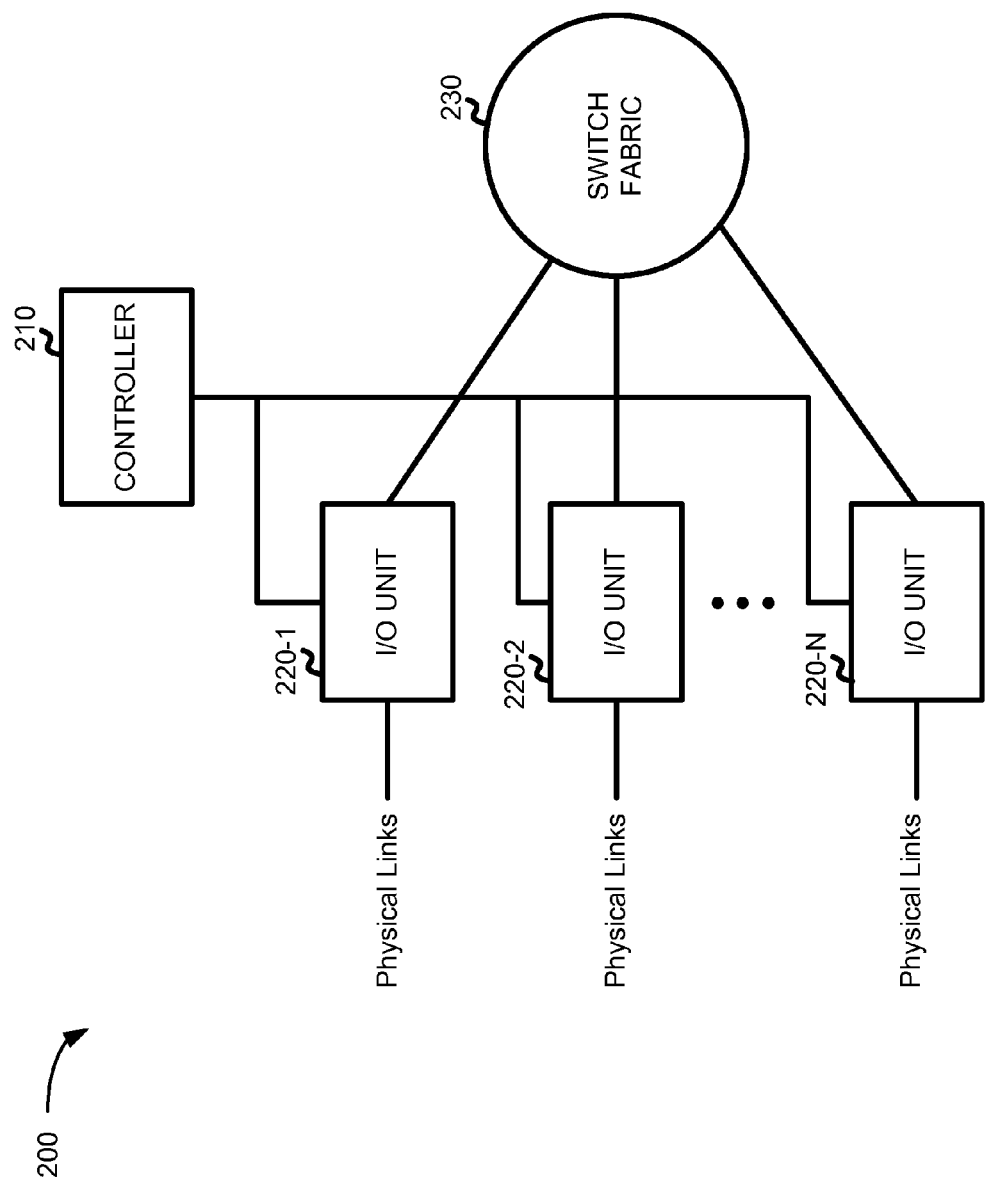
FIG. 2 is a diagram of example components of one or more network nodes of FIG. 1.

FIG. 2 is a diagram of example components of a node 200 that may correspond to node 110. Additionally, or alternatively, each node 110 may include one or more of nodes 200. In this example implementation, node 200 may take the form of a router, although the systems and/or methods herein may be implemented in another type of network device. For example, node 200 may take the form of another data transfer device, such as a gateway, a switch, a firewall, a network interface card (NIC), a hub, a bridge, a proxy server, an optical add-drop multiplexer (OADM), or some other type of device that processes and/or transfers traffic.

Node 200 may include a controller 210, a set of input/output (I/O) units 220-1, 220-2, . . . , 220-P (where P≥1) (hereinafter referred to collectively as "I/O units 220" and individually as "I/O unit 220"), and a switch fabric 230. Although, FIG. 2 illustrates example components of node 200, in other implementations, node 200 may include additional components, fewer components, different components, or differently arranged components than those illustrated in FIG. 2 and described herein. Additionally, or alternatively, one or more operations described as being performed by a particular component of node 200 may be performed by one or more other components, in addition to or instead of the particular component of node 200.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high level management functions for node 200. For example, controller 210 may maintain the connectivity and manage information/data necessary for transferring packets by node 200. Controller 210 may create routing tables based on network topology information, create forwarding tables based on the routing tables, and communicate the forwarding tables to I/O units 220. I/O units 220 may use the forwarding tables to perform route lookup for incoming packets and perform the forwarding functions for node 200. Controller 210 may also perform other general control and monitoring functions for node 200. Controller 210 may perform synchronization operations and/or modified two-step synchronization operations. Controller 210 may include and/or execute a master clock, which controller 210 may use to perform a synchronization operation and/or a modified two-step synchronization operation with slave node 110. Controller 210 may include and/or execute a clock, which controller 210 may use to perform a synchronization operation and/or a modified two-step synchronization operation with master node 110.

I/O unit 220 may include a component or collection of components to receive incoming packets, to process incoming and/or outgoing packets, and/or to transmit outgoing packets. For example, I/O unit 220 may include I/O ports, a packet forwarding component (PFC), an Ethernet interface and/or another type of interface, a central processing unit (CPU), and/or a memory device. I/O unit 220 may include a collection of ports that receive or transmit packets via physical links. I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 100).

Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using the forwarding table from controller 210 to determine destination information. If the destination indicates that the data should be sent out on a physical link, connected to I/O unit 220, then I/O unit 220 may prepare the data for transmission by, for example, adding any necessary headers (e.g., timestamps, information associated with follow-up packets, information associated with delay response packets, etc.) and/or modifying existing headers, and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may transmit the data to the other I/O unit 220 via switch fabric 230.

I/O unit 220 may process a sync packet by appending, to the sync packet, information associated with a follow-up packet that corresponds to a prior sync packet. I/O unit 220 may append the information associated with the follow-up packet (e.g., that includes a sync timestamp associated with the prior sync packet and/or other information associated with the follow-up packet) as a time-length-value (TLV) field associated with the sync packet. The TLV field may permit data, of varying length, type, or value, to be specified and/or appended to the sync packet (e.g., as a header, a trailer, etc.). In another example, the information associated with the follow-up packet may be embedded within the sync packet (e.g., within the header, payload, trailer, etc.).

In another example, I/O unit 220 may, in response to a delay request packet, process a follow-up packet by appending, within the follow-up packet, information associated with a delay response packet. I/O unit 220 may store the sync time stamp in the follow-up packet. I/O unit 220 may also append, to the follow-on packet, the information, associated with the delay response packet (e.g., that includes a delay timestamp), as a TLV field, associated with the follow-up packet. In another example, I/O unit 220 may embed the information associated with the delay response packet within the follow-on packet (e.g., within a follow-on packet header, trailer, payload, etc.).

I/O unit 220 and/or controller 210 may use a data integrity algorithm for error detection and/or correction (e.g., a hash function, checksum function, cryptographic hash function, forward error correction codes, etc.) to generate information associated with error detection (e.g., a checksum, etc.) and/or error correction (e.g., an error correcting code (ECC), etc.). I/O unit 220 may store the forward error detection and/or correction information to a packet (e.g., a sync packet, a follow-up packet, etc.).

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Figure 3:
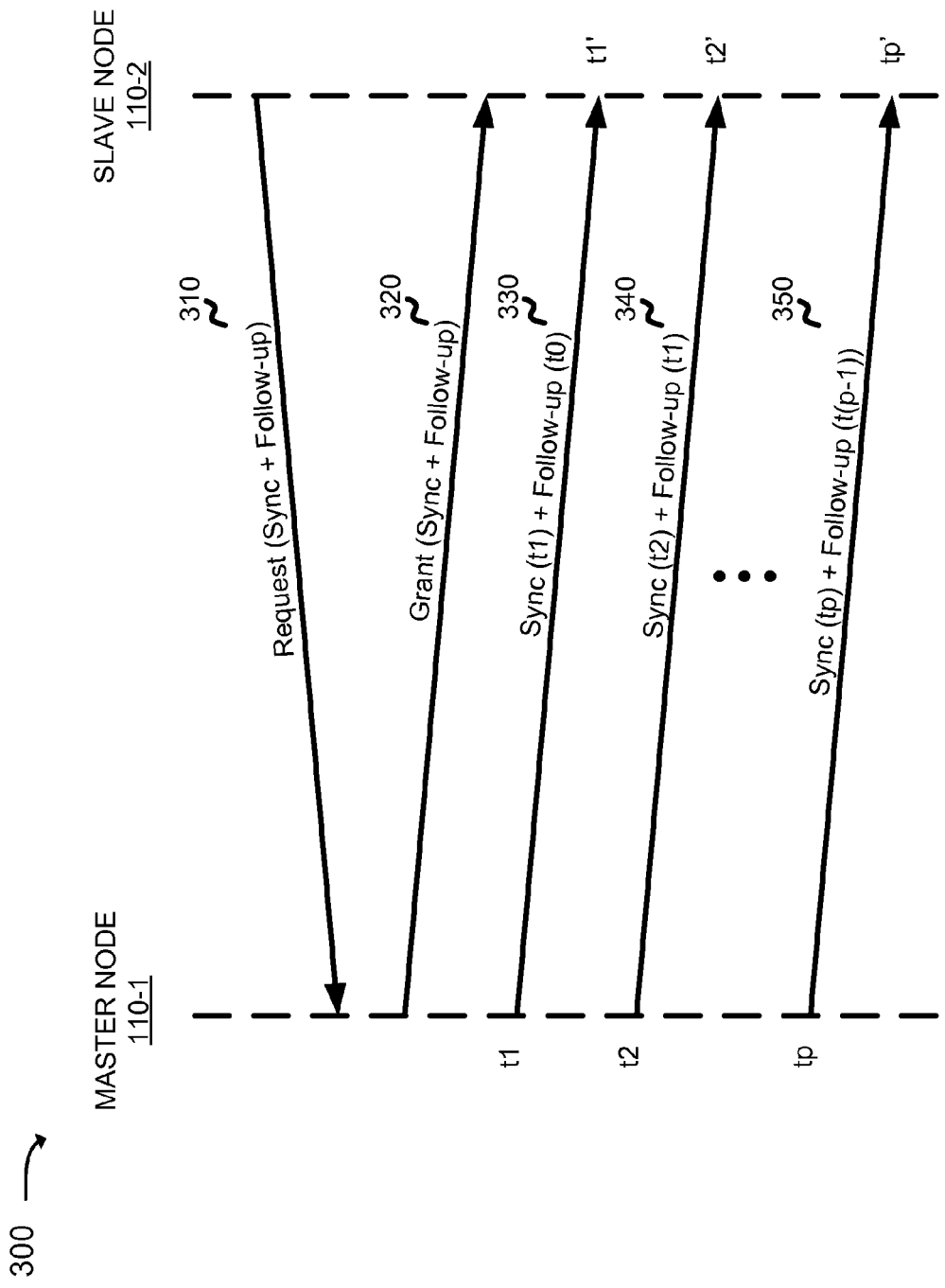
FIG. 3 is a diagram of an example signal flow, associated with a modified two-step synchronization operation using a modified synchronization packet.

FIG. 3 is a diagram of an example signal flow, associated with a modified two-step synchronization operation using a modified synchronization packet. An example network portion 300 may include master node 110-1 and slave node 110-2. Master node 110-1 and/or slave node 110-2 may include features described above in connection with FIGS. 1 and/or 2.

As shown in FIG. 3, an example modified two-step synchronization operation, using a modified synchronization packet, may include receiving a request packet to perform a modified two-step synchronization operation, as a request (sync+follow-up) indication 310, from slave device 110-2. The request packet may indicate that slave node 110-2 is capable of performing the modified two-step synchronization operation in a manner that combines a sync packet with information associated with a follow-up packet. The information associated with the follow-up packet may be associated with another sync packet that was transmitting to slave device 110-2 at a prior point in time. The information associated with the follow-up packet may include a sync timestamp associated with the other sync packet.

Master node 110-1 may receive indication 310 and may transmit a grant packet that indicates that the modified two-step synchronization operation is to be performed, as a grant (sync+follow-up) indication 320, to slave node 110-2. Slave node 110-2 may receive indication 320 indicating that a sync packet is to include information associated with a sync timestamp that corresponds to a previous sync packet. Master node 110-1 may generate a sync packet and may append, to the sync packet, a sync timestamp that identifies a prior point in time (e.g., t0) that a preceding sync packet was transmitting to slave node 110-2. Master node 110-1 may transmit the sync packet, as a sync (t1)+follow-up (ts0) indication 330, to slave node 110-2. Master node 110-1 may temporarily store (e.g., in a memory associated with master node 110-1) a point in time (e.g., t1) that the sync packet was transmitted to slave node 110-2. During a standard two-step synchronization operation, the sync timestamp would have been sent, to slave node 110-2, via another packet (e.g., a follow-up packet). Additionally, transmitting the sync timestamp via the sync packet, in the manner described above with respect to the modified two-step synchronization operation, may reduce a quantity of packets being transported during a synchronization operation, which may cause utilization of bandwidth and/or processing resources to be reduced.

Slave node 110-2 may receive indication 330 and may temporarily store (e.g., in a memory associated with slave node 110-2) a particular time (e.g., t1') at which the sync packet was received. Slave node 110-2 may use the sync timestamp, removed from the sync packet, to determine a quantity of delay associated with a network path over which traffic is transported from master node 110-1 to slave node 110-2 (e.g., as described in greater detail below).

Master node 110-1 may generate another sync packet and may append, to the other sync packet, another sync timestamp that identifies the point in time (e.g., t1) that the sync packet was transmitted to slave node 110-2. Master node 110-1 may transmit the other sync packet, as sync (t2)+follow-up (t1) indication 340, to slave node 110-2. Master node 110-1 may temporarily store another point in time (e.g., t2) that the other sync packet was transmitted to slave node 110-2. Slave node 110-2 may receive indication 340 and may temporarily store another particular time (e.g., t2') at which the other sync packet was received. Slave node 110-2 may determine a delay associated with traffic being transported over a network path from master node 110-1 to slave node 110-2. The delay may be determined based on a difference between the particular time (e.g., t1') when the sync packet was received and the point in time (e.g., t1) when the sync packet was transmitted (e.g., $Td_{M-S}=t1'-t1$, where $Td_{M-S}$ is the delay associated with the network path). Slave node 110-2 may use the delay associated with the network path and another delay, associated with another network path over which traffic is transported from slave node 110-2 to master node 110-1, to identify a quantity of time by which to correct the clock relative to the master clock.

Master node 110-1 may, in a manner similar to that described above, repeat the modified two-step synchronization operation by generating one or more further sync packets that include one or more further timestamps associated with one or further prior sync packets. Master node 110-1 may transmit the one or more further sync packets, as a sync (tp)+follow-up (t(p−1)) indication 350 (where p≥1), to slave node 110-2.

Figure 4:
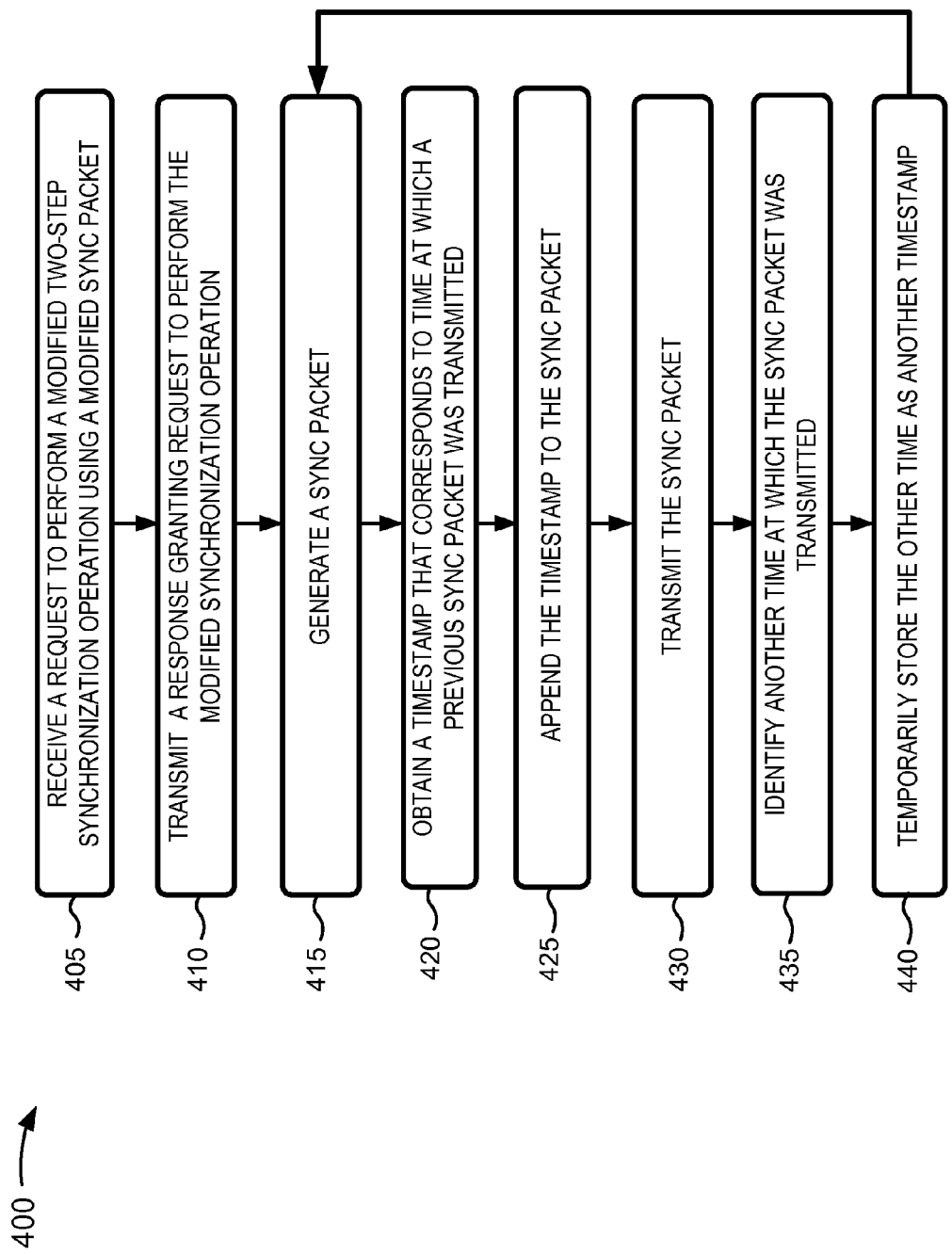
FIG. 4 is a flow chart of an example process for performing a modified two-step synchronization operation using a modified synchronization packet in a manner described herein.

FIG. 4 is a flow chart of an example process 400 for performing a modified two-step synchronization operation using a modified sync packet in a manner described herein. In one example implementation, process 400 may be performed by master node 110-1. In another example implementation, some or all of process 400 may be performed by another node or group of nodes separate from, or in combination with master node 110-1.

As shown in FIG. 4, process 400 may include receiving a request to perform a modified two-step synchronization operation using a modified sync packet (block 405) and transmitting a response granting the request to perform the modified two-step synchronization operation (block 410). For example, master node 110-1 may receive a request, from slave node 110-2, to perform a modified two-step synchronization operation. The request to perform the identified operation may be transmitted to master node 110-1 via a request packet that indicates that slave node 110-2 is capable of performing the modified two-step synchronization operation. Master node 110-1 may, in response to the request, generate a response packet that indicates that the modified two-step synchronization operation is to be performed.

If, however, master node 110-1 is not configured to perform the modified two-step synchronization operation, master node 110-1 may transmit another response packet that indicates that the modified two-step synchronization operation is not to be performed and/or that a standard synchronization is to be performed.

As also shown in FIG. 4, process 400 may include generating a sync packet (block 415) and obtaining a timestamp that corresponds to a time at which a previous sync packet was transmitted (block 420). Master node 110-1 may generate a sync packet. The sync packet may include a source address (e.g., an media access control (MAC) address), information associated with an Internet protocol (IP) (e.g., IPv4, IPv6, etc.), a source port identifier, a destination address associated with slave node 110-2, a destination port associated with slave node 110-2, information associated with error detection and/or correction (e.g., one or more checksums, etc.), a TLV field, etc. Master node 110-1 may retrieve, from a memory associated with master node 110-1, a timestamp associated with a previous sync packet. The timestamp may identify a prior point in time that the previous sync packet was transmitted to slave node 110-2.

As further shown in FIG. 4, process 400 may include appending the time stamp to the sync packet (block 425) and transmitting the sync packet (block 430). For example, master node 110-1 may append the timestamp to the sync packet in a number of ways. In one example, the timestamp may be appended, to the sync packet, as a header, label, trailer, tag, etc. In another example, the timestamp may be embedded within a header, label trailer, tag, and/or payload associated with the sync packet. In another example implementation, the timestamp may be stored in the TLV field associated with the sync packet. When storing the timestamp, within the TLV field of the sync packet, master node 110-1 may store information associated with a length of the TLV field that stores the timestamp, information associated with a type of information being stored in the TLV field, and/or other information associated with the timestamp. Master node 110-1 may transmit the sync packet (e.g., that includes the timestamp that corresponds to the previous sync packet) to slave node 110-2.

Figure 5:
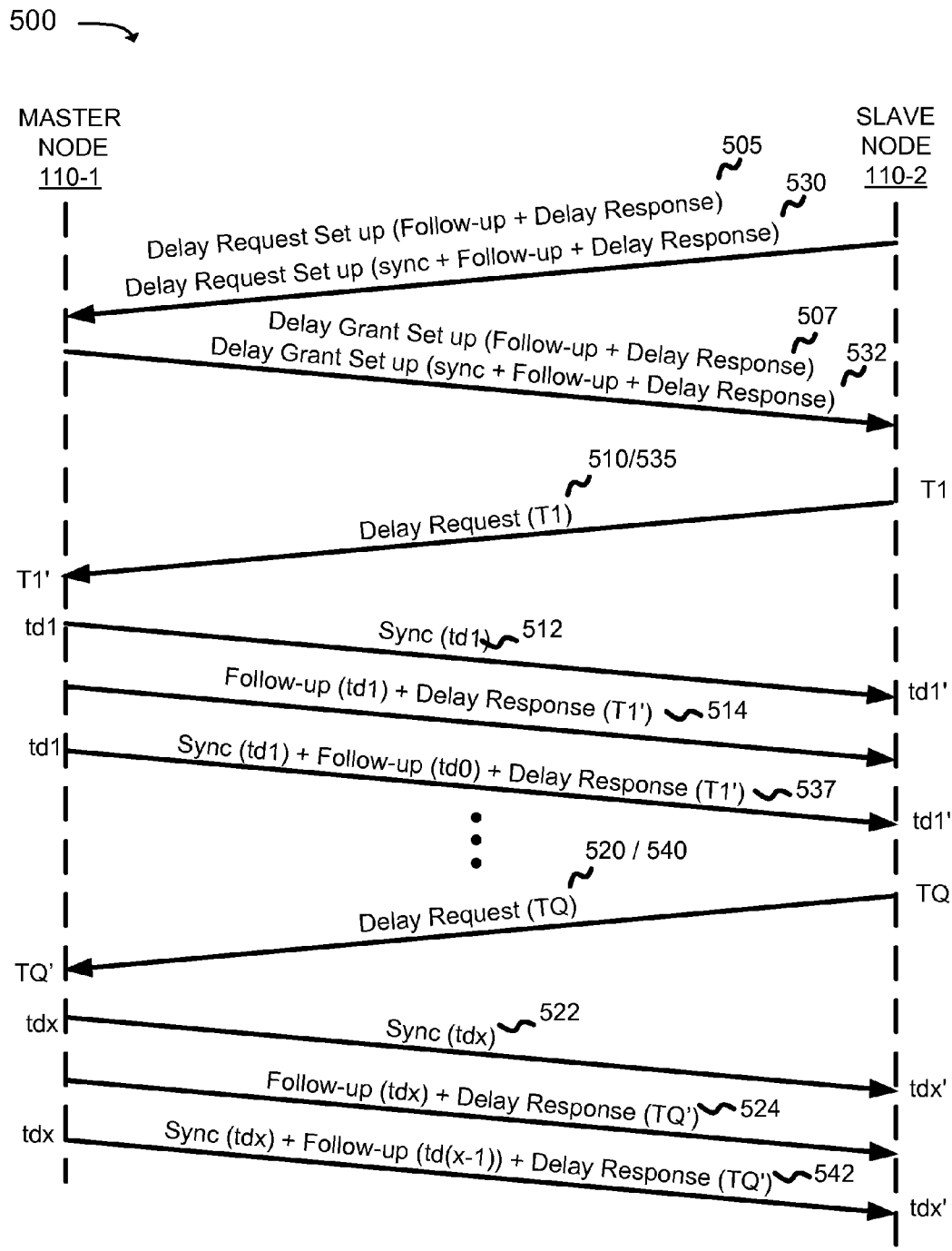
FIG. 5 is a diagram of an example signal flow, associated with a modified two-step synchronization operation using a modified follow-up packet or a modified sync packet.

Slave node 110-2 may receive the sync packet and may identify a quantity of delay associated with a network path over which traffic is transported from master node 110-1 to slave node 110-2. Slave node 110-2 may remove the timestamp from the sync packet and may use the timestamp and another time at which slave node 110-2 received the previous sync packet to identify the quantity of delay associated with the network path. Slave node 110-2 may use the quantity of delay and/or other information to identify a quantity of time by which a clock, hosted by slave node 110-2, is to be corrected relative to a master clock hosted by master node 110-1 (e.g., described in greater detail below with respect to FIGS. 5 and 6).

As yet further shown in FIG. 4, process 400 may include identifying another time at which the sync packet was transmitted (block 435) and temporarily storing the other time as another timestamp that corresponds to the sync packet (block 440). Master node 110-1 may temporarily store a time at which the sync packet was transmitted to slave node 110-2. Master node 110-1 may temporarily store the time, as another timestamp, that corresponds to the sync packet. Master node 110-1 may, at a later point in time and in a manner similar to that described above (e.g., with respect to blocks 415-430), generate another sync packet to which the other timestamp is to be appended for transmitting to slave node 110-2.

In another example implementation, master node may perform another modified two-step synchronization operation, using the modified synchronization packet, with all or a portion of other slave nodes 110 (e.g., slave nodes 110-3, . . . , 110-M). For example, master node 110-1 may perform the other modified two-step synchronization operation with one or more other slave nodes 110, in a unicast mode, based on a determination that the one or more other slave nodes 110 are configured to perform a modified two-step synchronization operation. In another example, master node 110-1 may perform the other modified two-step synchronization operation with the one or more other slave nodes 110, in a multicast mode, based on a determination that the one or more other slave nodes 110 are configured to perform a modified two-step synchronization operation and/or are included in a group membership associated with the modified two-step synchronization operation. Performing the other modified two-step synchronization operation may enable the one or more slave nodes 110 to determine a quantity of offset and/or error by which to correct a respective clock associated with each of the one or more slave nodes 110-2.

FIG. 5A is a diagram of an example signal flow, associated with a modified two-step synchronization operation using a modified follow-up packet or a modified sync packet. An example network portion 500 may include master node 110-1 and slave node 110-2. Master node 110-1 and/or slave node 110-2 may include features described above in connection with FIGS. 1 and/or 2.

As shown in FIG. 5A, an example modified two-step synchronization operation, using the modified follow-up packet, may include receiving a packet requesting to perform a modified two-step synchronization operation, as a delay request set up (follow-up+delay response) indication 505, from slave node 110-2. The packet may indicate that slave node 110-2 is capable of performing the modified two-step synchronization operation in a manner that combines, in a single packet (e.g., a follow-up packet), information associated with a follow-up packet with information associated with a delay response packet.

Master node 110-1 may receive indication 505 and may transmit another packet that indicates that the modified two-step synchronization operation is to be performed, as a delay grant set up (follow-up+delay response) indication 507, to slave node 110-2. Slave node 110-2 may receive indication 507 indicating that the follow-up packet is to include information associated with the sync timestamp and/or information associated with a delay response packet.

Slave node 110-2 may generate a delay request packet and may transmit the delay request packet, as a delay request (T1) indication 510, to master node 110-1. Slave node 110-2 may temporarily store (e.g., in a memory associated with slave node 110-2) a time (e.g., T1) that the delay request packet was transmitted to master node 110-1. Master node 110-1 may receive indication 510 and may temporarily store (e.g., in a memory associated with master node 110-1) another time (e.g., T1') at which the delay request packet was received. At a later point in time, master node 110 may generate a sync packet and may transmit the sync packet, as a sync (td1) indication 512, to slave node 110-2. Master node 110-1 may temporarily store a transmit time (e.g., td1) at which the sync packet was transmitted. Slave node 110-2 may receive indication 512 and may temporarily store a receive time (e.g., td1') at which the sync packet was received from master node 110-1.

Master node 110-1 may generate a follow-up packet, associated with the sync packet, that stores information associated with a timestamp (e.g., as transmit time, td1) that corresponds to the sync packet. Additionally, or alternatively, master node 110-1 may append information associated with the other time (e.g., T1') to the follow-up packet. Master node 110-1 may transmit the follow-up packet, as a follow-up (td1)+delay response (T1') indication 514, to slave node 110-2. During a standard two-step synchronization operation, information, associated with the other time, would have been sent, to slave node 110-2, via another packet (e.g., a delay-response packet). Additionally, transmitting the information, associated with the other time via the follow-up packet may reduce a quantity of packets being transported during a synchronization operation, which may cause utilization of bandwidth and/or processing resources to be reduced.

Slave node 110-2 may receive indication 514 and may use the information associated with the timestamp, removed from the follow-up packet, to determine a quantity of delay associated with a network path over which traffic is transported from master node 110-1 to slave node 110-2. The delay may be determined based on a difference between the receive time (e.g., td1') and the timestamp (e.g., td1) when the sync packet was transmitted (e.g., $Td_{M-S}$=td1'−td1, where $Td_{M-S}$ is the delay associated with the network path from master node 110-1 to slave node 110-2).

Slave node 110-2 may use the information associated with other time (e.g., T1'), removed from the follow-up packet, to determine another quantity of delay associated with another network path over which traffic is transported from slave node 110-2 to master node 110-1. The other quantity of delay may be determined based on a difference between the other time (e.g., T1' that the delay request packet was received) and the time (e.g., T1 that the delay request was transmitted) (e.g., $Td_{S-M}$=T1'−T1, where $Td_{S-M}$ corresponds to the delay associated with the other network path from slave node 110-2 to master node 110-1).

Slave node 110-2 may use the quantity of delay associated with the network path and the other quantity of delay, associated with the other network path, to identify a quantity of offset and/or error associated with the ordinary clock relative to the master clock. Slave node 110-2 may use the quantity of offset and/or error to correct a time associated with the clock.

Master node 110-1 may, in a manner similar to that described above, receive one or more other delay request packets, as a delay request (TQ) indication 520, from slave node 110-2 (e.g., where TQ corresponds to a time at which slave node 110-2 transmitted the delay request packet and TQ' corresponds to another time at which master node 110-1 received the delay request packet). Master node 110-1 may repeat the modified two-step synchronization operation by generating one or more other sync packets and may transmit the one or more other sync packets, as a sync(tdx) indication 522, to slave node 110-2 (e.g., where tdx corresponds to a time at which master node 110-1 transmitted the one or more sync packets). Master node 110-1 may generate one or more follow-up packets (e.g., that correspond to the one or more sync packets) that include a particular time at which the one or more delay request packets was received (e.g., TQ'). Master node 110-1 may transmit the one or more follow-up packets, as a follow-up (tdx)+delay response (TQ') indication 524 (where Q≥1 and x≥1), to slave node 110-2.

In another example implementation, master node 110-1 may include receiving a packet requesting to perform a modified two-step synchronization operation, as a delay request set up (sync+follow-up+delay response) indication 530, from slave node 110-2. The packet may indicate that slave node 110-2 is capable of performing the modified two-step synchronization operation in a manner that combines, in a single packet (e.g., a sync packet), information associated with a sync packet, information associated with a follow-up packet that corresponds to a previous sync packet, and/or information associated with a delay response packet.

Master node 110-1 may receive indication 530 and may transmit another packet that indicates that the modified two-step synchronization operation is to be performed, as a delay grant set up (sync+follow-up+delay response) indication 532, to slave node 110-2. Slave node 110-2 may receive indication 532 indicating that the sync packet is to include information associated with the sync packet, information associated with the follow-on packet (e.g., that includes a sync timestamp associated with a previous sync packet), and/or information associated with a delay response packet.

Slave node 110-2 may generate a delay request packet and may transmit the delay request packet, as a delay request (T1) indication 535, to master node 110-1. Slave node 110-2 may temporarily store the time (e.g., T1) that the delay request packet was transmitted to master node 110-1. Master node 110-1 may receive indication 535 and may temporarily store the other time (e.g., T1') at which the delay request packet was received. At a later point in time, master node 110-1 may generate a sync packet and may append, to the sync packet, information associated with the follow-on packet (e.g., that includes the sync timestamp (e.g., t0) associated with the prior sync packet) transmit the sync packet. Additionally, or alternatively, master node 110-1 may append information associated with a delay response packet (e.g., that includes the other time (T1')) to the sync packet. Master node 110-1 may transmit the sync packet, as a sync (td1)+follow-up (td0)+delay response (T1') indication 537, to slave node 110-2. Master node 110-1 may temporarily store a transmit time (e.g., td1) at which the sync packet was transmitted. Slave node 110-2 may receive indication 537 and may temporarily store a receive time (e.g., td1') at which the sync packet was received from master node 110-1.

During a standard two-step synchronization operation, information, associated with the other time, would have been sent, to slave node 110-2, via another packet (e.g., a delay-response packet). Additionally, transmitting the information, associated with the other time via the sync packet may reduce a quantity of packets being transported during a synchronization operation, which may cause utilization of bandwidth and/or processing resources to be reduced.

Slave node 110-2 may use the information associated with the timestamp, removed from the sync packet, to determine, in a manner described above, a quantity of delay associated with the network path over which traffic is transported from master node 110-1 to slave node 110-2. Slave node 110-2 may use the information associated with other time (e.g., T1'), removed from the sync packet, to determine, in the manner described above, another quantity of delay associated with the other network path over which traffic is transported from slave node 110-2 to master node 110-1. Slave node 110-2 may use the quantity of delay associated with the network path and the other quantity of delay, associated with the other network path, to identify a quantity of offset and/or to correct a time associated with the clock.

Master node 110-1 may, in a manner similar to that described above, receive one or more other delay request packets, as a delay request (TQ) indication 540, from slave node 110-2. Master node 110-1 may repeat the modified two-step synchronization operation by generating one or more other sync packets and may append, to the one or more other sync packets, information associated with one or more other follow-on packets (e.g., that include a respective sync timestamp (td(x−1)) associated with one or more prior sync packets). Additionally, or alternatively, master node 110-1 may append information associated with one or more delay response packets (e.g., that include a respective other time (TQ') at which the one or more other delay requests were received) to the sync packet. Master node 110-1 may transmit the sync packet, as a sync (tdx)+follow-up (td(x−1))+delay response (TQ') indication 542 (where Q≥1 and x≥1) where Q≥1 and x≥1), to slave node 110-2. Master node 110-1 may temporarily store a transmit time (e.g., tdx) at which the one or more other sync packets were transmitted. Slave node 110-2 may receive indication 542 and may temporarily store a receive time (e.g., tdx') at which indication 542 was received from master node 110-1.

Figure 6:
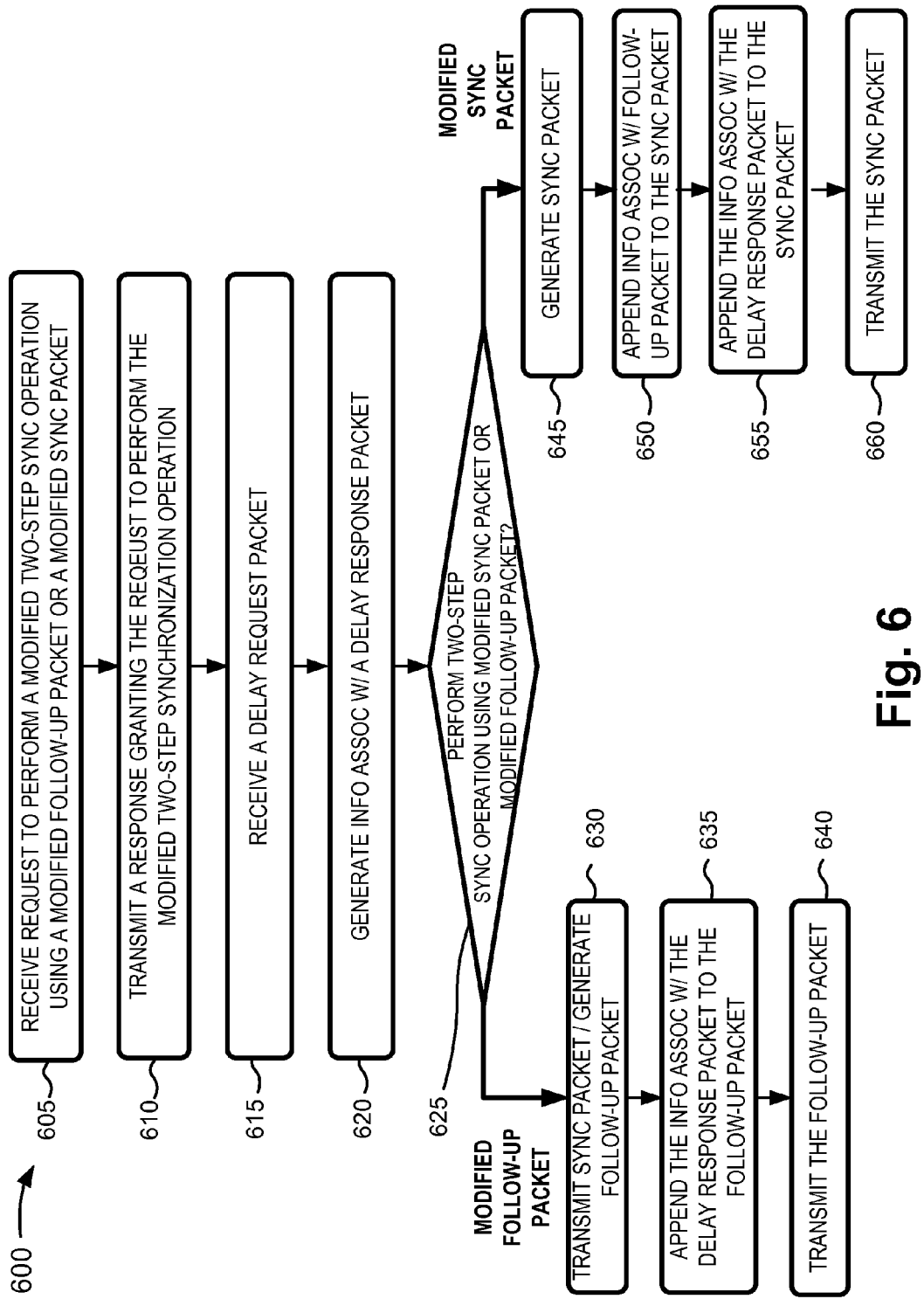
FIG. 6 is a flow chart of an example process for performing a modified two-step synchronization operation using a modified follow-up packet or a modified synchronization packet in a manner described herein.

FIG. 6 is a flow chart of an example process 600 for performing a modified two-step synchronization operation using a modified follow-up packet or a modified sync packet in a manner described herein. In one example implementation, process 600 may be performed by master node 110-1. In another example implementation, some or all of process 600 may be performed by another node or group of nodes separate from, or in combination with master node 110-1.

As shown in FIG. 6, process 600 may include receiving a request to perform a modified two-step synchronization operation using a modified follow-up packet or a modified sync packet (block 605) and transmitting a response granting the request to perform the modified two-step synchronization operation (block 610). For example, master node 110-1 may receive a request, from slave node 110-2, to perform a modified two-step synchronization operation using a modified follow-up packet. The request to perform the modified two-step synchronization operation may be transmitted to master node 110-1 via a delay request set up packet that indicates that slave node 110-2 is capable of performing the modified two-step synchronization operation using the modified follow-up packet. Master node 110-1 may, in response to the request, generate a delay response set up packet that indicates that the modified two-step synchronization operation is to be performed. Master node 110-1 may transmit the delay response set up packet to slave node 110-2.

If, however, master node 110-1 is not configured to perform the modified two-step synchronization operation using the modified follow-up packet, master node 110-1 may transmit another response packet that indicates that the modified two-step synchronization operation is not to be performed and/or that a standard synchronization is to be performed.

In another example implementation, master node 110-1 may receive a request, from slave node 110-2, to perform a modified two-step synchronization operation using a modified sync packet. The request to perform the modified two-step synchronization operation may be transmitted to master node 110-1 via a delay request set up packet that indicates that slave node 110-2 is capable of performing the modified two-step synchronization operation using the modified sync packet. Master node 110-1 may, in response to the request, transmit a delay response set up packet that indicates that the modified two-step synchronization operation, using the modified sync packet, is to be performed.

As also shown in FIG. 6, process 600 may include receiving a delay request packet (block 615) and generating information associated with a delay response packet (block 620). For example, slave node 110-2 may receive the delay response set up packet and may generate a delay request packet. Slave node 110-2 may transmit the delay request packet to master node 110-1 and may temporarily store a time at which the delay request packet was transmitted. Master node 110-1 may receive the delay request packet and may temporarily store another time at which the delay request packet was received. Master node 110-1 may, in response to receiving the delay request packet, generate information associated with a delay response packet. The information, associated with the delay response packet, may include information associated with the other time at which the delay request packet was received from slave node 110-2.

As further shown in FIG. 6, if a two-step synchronization operation using modified follow-up packet is to be performed (block 625—MODIFIED FOLLOW-UP PACKET), then process 600 may include transmitting a sync packet and generating a follow-up packet (block 630). For example, based on the response granting the request to perform the modified two-step synchronization operation using the modified follow-up packet (e.g., as described above with respect to block 610), master node 110-1 may generate a sync packet and may transmit the sync packet to slave node 110-2. Master node 110-1 may obtain a timestamp, associated with the sync packet, that corresponds to a point in time at which the sync packet was transmitted to slave node 110-2. Slave node 110-2 may receive the sync packet and may temporarily store a time at which the sync packet was received.

Master node 110-1 may generate a follow-up packet associated with the sync packet. The follow-up packet may store the timestamp that corresponds to the time that the sync packet was transmitted to slave node 110-2. The follow-up packet may include a source address (e.g., a MAC, an IP address) associated with master node 110-1, information associated with an IP protocol (e.g., IPv4, IPv6, etc.), a source port identifier, a destination address associated with slave node 110-2, a destination port associated with slave node 110-2, the timestamp information, information associated with error detection and/or correction (e.g., one or more checksums, etc.), a TLV field, etc.

As further shown in FIG. 6, process 600 may include appending the information, associated with the delay response packet, to the follow-up packet (block 635) and transmitting the follow-up packet (block 640). For example, master node 110-1 may append the information, associated with the delay response packet, to the follow-up packet in a number of ways. In one example, the information associated with delay response packet may be appended, to the follow-up packet, as a header, label, trailer, tag, etc. In another example, the information associated with the delay response packet may be embedded within the header, label trailer, tag, etc. and/or the payload associated with the follow-up packet. In one example implementation, the information, associated with the delay response packet, may be stored in the TLV field associated with the follow-up packet. When storing the information associated with the delay response packet, within the TLV field of the follow-up packet, master node 110-1 may store information associated with a length of the TLV field, information associated with a type of information being stored in the TLV field, and/or other information associated with the information associated with the delay response packet. Master node 110-1 may transmit the follow-up packet (e.g., that includes the timestamp that corresponds to the sync packet and/or the information associated with the delay response packet) to slave node 110-2.

Slave node 110-2 may receive the follow-up packet and may identify a quantity of delay associated with a network path over which traffic is transported from master node 110-1 to slave node 110-2. Slave node 110-2 may remove the timestamp from the follow-up packet to identify the point in time that the sync packet was transmitted by master node 110-1. Slave node 110-2 may use the point in time and the other point in time at which slave node 110-2 received the sync packet to identify a quantity of delay associated with the network path.

Slave node 110-2 may remove, from the follow-up packet, the information associated with the delay response packet to obtain the other time at which the delay request packet was received by master node 110-1. Slave node 110-2 may determine another quantity of delay, associated with another network path over which traffic is transported from slave node 110-2 to master node 110-1. The other quantity of delay may be based on a difference between the time at which slave node 110-2 transmitted, to master node 110-1, the delay request packet and the other time that the delay request packet was received by master node 110-1.

Slave node 110-2 may use the quantity of delay associated with the network path and the other quantity of delay, associated with the other network path, to identify a quantity of offset and/or error associated with the clock relative to the master clock. Slave node 110-2 may use the quantity of offset and/or error to correct a time associated with the clock.

In another example implementation, master node may perform another modified two-step synchronization operation, using the modified follow-up packet, with all or a portion of other slave nodes 110 (e.g., slave nodes 110-3, . . . , 110-M). For example, master node 110-1 may perform the other modified two-step synchronization operation with one or more other slave nodes 110, in a unicast mode, based on a determination that the one or more other slave nodes 110 are configured to perform a modified two-step synchronization operation. In another example, master node 110-1 may perform the other modified two-step synchronization operation with the one or more other slave nodes 110, in a multicast mode, based on a determination that the one or more other slave nodes 110 are configured to perform a modified two-step synchronization operation and/or a included in a group membership associated with the modified two-step synchronization operation. Performing the other modified two-step synchronization operation may enable the one or more slave nodes 110 to determine a quantity of offset and/or error by which to correct a respective clock associated with each of the one or more slave nodes 110-2.

As further shown in FIG. 6, if a two-step synchronization operation using a modified sync packet is to be performed (block 625—MODIFIED SYNC PACKET), then process 600 may include generating a sync packet (block 645) and appending information associated with a follow-on packet to the sync packet (block 650). For example, based on the response granting the request to perform the modified two-step synchronization operation, using the modified sync packet (e.g., as described above with respect to block 610), master node 110-1 may generate a sync packet. The sync packet may include a source address (e.g., a MAC, an IP address) associated with master node 110-1, information associated with an IP protocol (e.g., IPv4, IPv6, etc.), a source port identifier, a destination address associated with slave node 110-2, a destination port associated with slave node 110-2, the timestamp information, information associated with error detection and/or correction (e.g., one or more checksums, etc.), a TLV field, etc. Master node 110-1 may, in a manner similar to that described above (e.g., with respect to block 425 of FIG. 4), append information associated with a follow-on packet, that corresponds to a previous sync packet, to the sync packet. The information, associated with the follow-on packet may include a timestamp that corresponds to a point in time that the previous sync packet was transmitted to slave node 110-2.

As yet further shown in FIG. 6, process 600 may include appending the information, associated with the delay response packet, to the sync packet (block 655) and transmitting the sync packet (block 660). For example, master node 110-1 may append the information, associated with the delay response packet, to the sync packet in a manner similar to that described above (e.g., with respect to block 635). The information associated with the delay response packet may include a time at which a delay request packet was received from slave node 110-2. Master node 110-1 may transmit the sync packet (e.g., that includes the information associated with the follow-up packet and/or the information associated with the delay response packet) to slave node 110-2.

Slave node 110-2 may receive the sync packet and may, in a manner similar to that described above (e.g., with respect to block 640), identify a quantity of delay associated with one or more network paths via which master node 110-1 and slave node 110-2 transport traffic. Slave node 110-2 may use the quantity of delay to identify a quantity of offset (e.g., associated with the one or more network paths) that can be used, by slave node 110-2, to correct a clock hosted by slave node 110-2.

Figure 7:
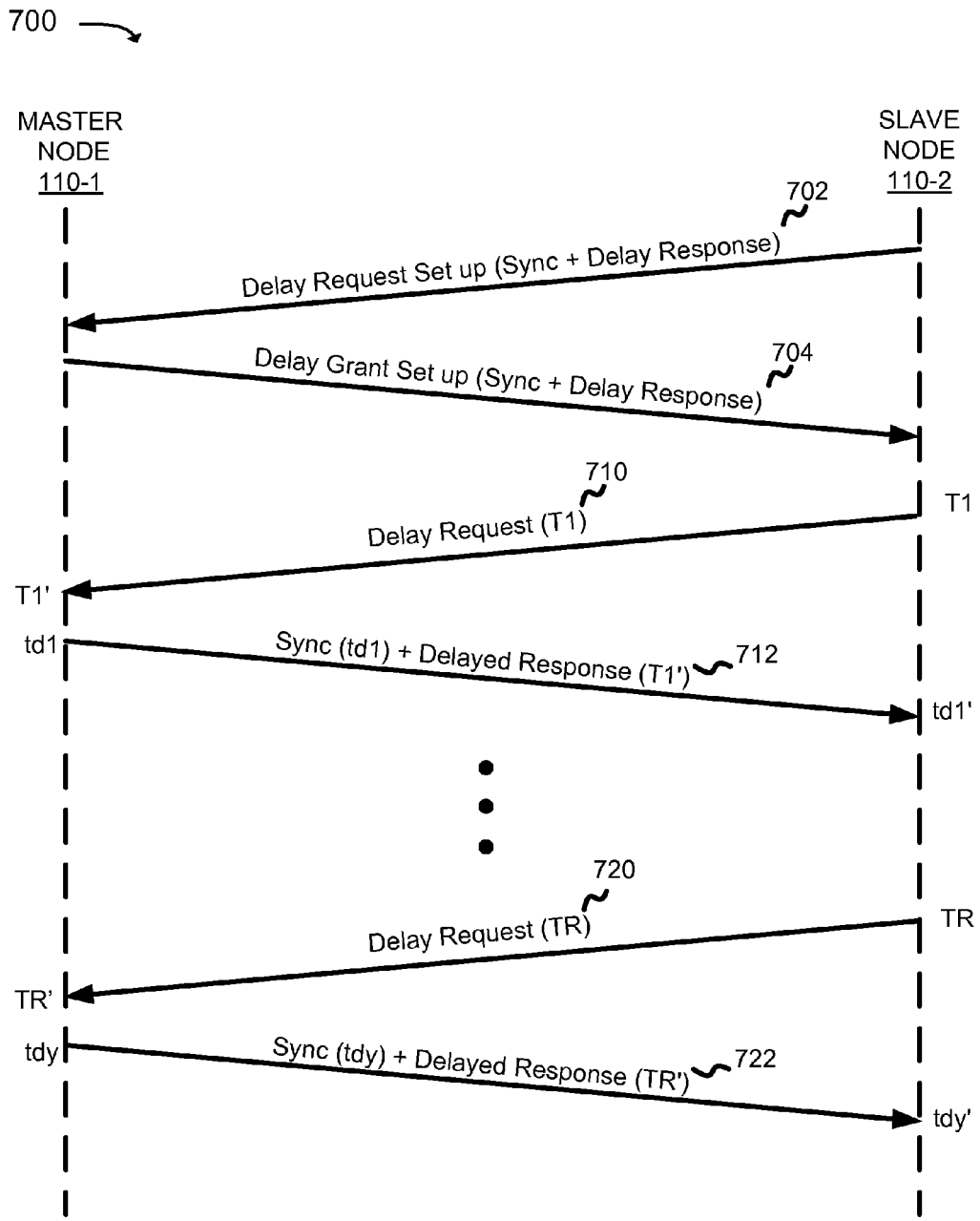
FIG. 7 is a diagram of an example signal flow, associated with a modified one-step synchronization operation using a modified sync packet.

FIG. 7 is a diagram of an example signal flow, associated with a modified one-step synchronization operation using a modified sync packet. An example network portion 700 may include master node 110-1 and slave node 110-2. Master node 110-1 and/or slave node 110-2 may include features described above in connection with FIGS. 1 and/or 2.

As shown in FIG. 7, an example modified one-step synchronization operation, using a modified sync packet, may include receiving a packet requesting to perform a modified one-step synchronization operation, as a delay request set up (sync+delay response) indication 702, from slave node 110-2. The packet may indicate that slave node 110-2 is capable of performing the modified one-step synchronization operation in a manner that combines, in a single packet (e.g., a sync packet), information associated with a delay response packet.

The information associated with the sync packet may include a sync timestamp that corresponds to a point in time when the sync packet is transmitted to slave node 110-2. The information associated with the delay response packet may include a time at which a delay request packet is received by master node 110-1.

Master node 110-1 may receive indication 702 and may transmit another packet that indicates that the modified one-step synchronization operation is to be performed, as a delay grant set up (sync+delay response) indication 704, to slave node 110-2. Slave node 110-2 may receive indication 704 indicating that the sync packet is to include information associated with the delay response packet.

Slave node 110-2 may generate a delay request packet and may transmit the delay request packet, as a delay request (T1) indication 710, to master node 110-1. Slave node 110-2 may temporarily store (e.g., in a memory associated with slave node 110-2) a time (e.g., T1) that the delay request packet was transmitted to master node 110-1. Master node 110-1 may receive indication 710 and may temporarily store (e.g., in a memory associated with master node 110-1) a time (e.g., T1') at which the delay request packet was received. At a later point in time, master node 110 may generate a sync packet. Master node 110-1 may append, to the sync packet, information associated with a delay response packet (e.g., that includes the time at which the delay response packet was received). Master node 110-1 may transmit the sync packet, as sync (td1)+delayed response (T1') indication 712, to slave node 110-2 and may store, in the sync packet, a sync timestamp that corresponds to another time (e.g., td1) at which the sync packet is transmitted to slave node 110-2. Slave node 110-2 may receive indication 712 and may temporarily store a receive time (e.g., td1') at which the sync packet was received from master node 110-1.

During a standard one-step synchronization operation, information, associated with the time at which the delay request packet was received, would have been sent, to slave node 110-2, via another packet (e.g., a delay-response packet). Additionally, transmitting the information, associated with the other time via the follow-up packet may reduce a quantity of packets being transported during a synchronization operation, which may cause utilization of bandwidth and/or processing resources to be reduced.

Slave node 110-2 may receive indication 712 and may, in a manner similar to that described above, determine a quantity of delay associated with each of one or more network paths between master node 110-1 and slave node 110-2. Slave node 110-2 may use the time at which the delay request packet was sent (e.g., T1), the time at which the delay request was received (e.g., T1', as obtained from the sync packet), the sync timestamp (e.g., td1), and the time at which the sync packet was received (e.g., td1') to determine the delay and/or to correct a time associated with the clock.

Master node 110-1 may, in a manner similar to that described above, receive one or more other delay request packets, as a delay request (TR) indication 720, from slave node 110-2 (e.g., where TR corresponds to a time at which slave node 110-2 transmitted the delay request packet and TR' corresponds to another time at which master node 110-1 received the delay request packet). Master node 110-1 may repeat the modified one-step synchronization operation by generating one or more other sync packets. Master node 110-1 may append, to the one or more sync packets, a respective other time (e.g., TR') at which the one or more delay requests were received by master node 110-1. Master node 110-1 may transmit the one or more sync packets, as a sync (tdy)+delayed response (TR') indication 722 (where R≥1 and y≥1), to slave node 110-2 (e.g., where tdy corresponds to a respective time at which master node 110-1 transmitted the one or more sync packets). Master node 110-1 may append, to the one or more sync packets, a respective sync timestamp that corresponds to the respective time at which the one or more sync packets were transmitted. Slave node 110-2 may receive indication 722 and may, in a manner similar to that described above, perform an operation to correct the clock based on a quantity of delay associated with each of the one or more network paths between master node 110-1 and slave node 110-2.

Figure 8:
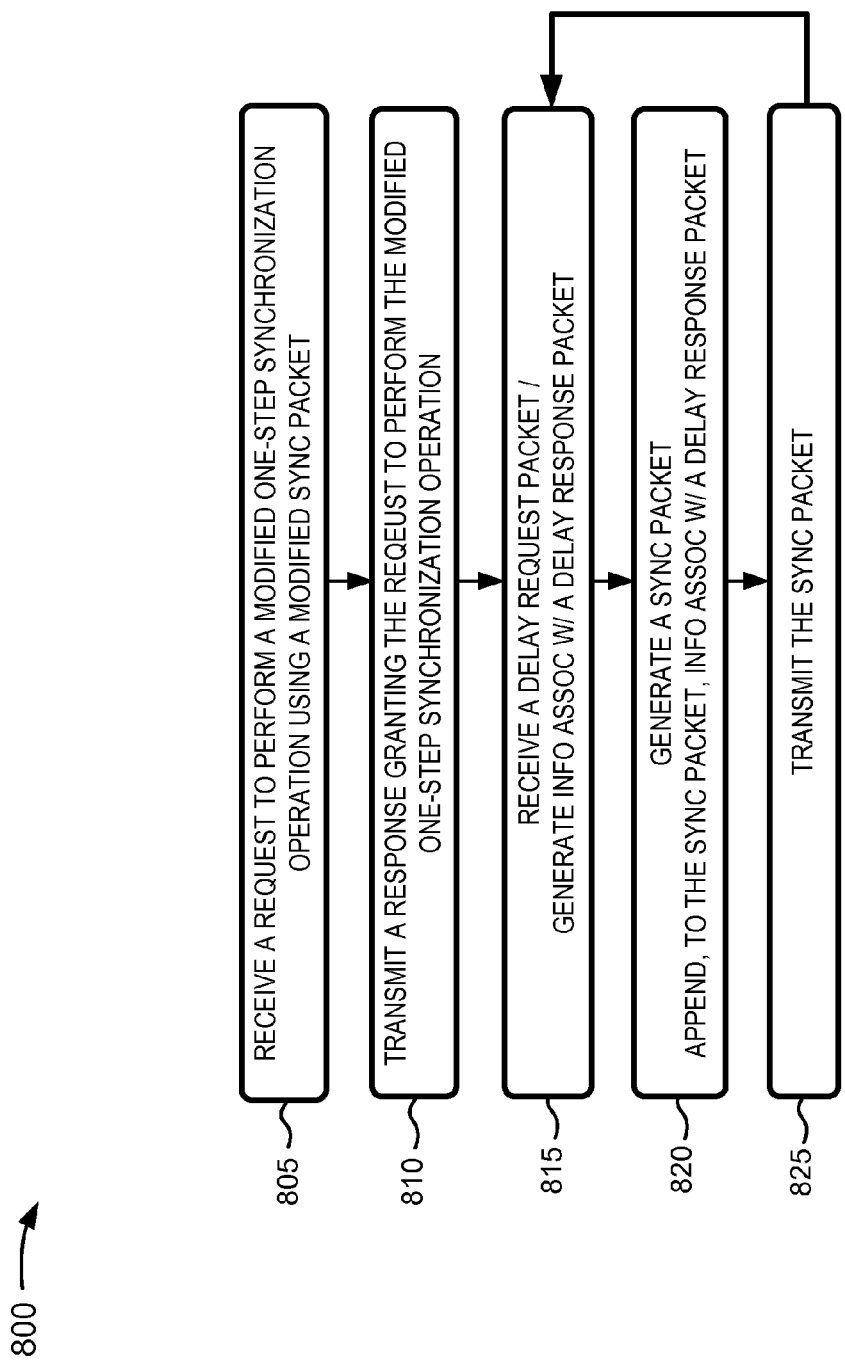
FIG. 8 is a flow chart of an example process for performing a modified one-step synchronization operation using a modified synchronization packet in a manner described herein.

FIG. 8 is a flow chart of an example process 800 for performing a modified one-step synchronization operation using a modified synchronization packet in a manner described herein. In one example implementation, process 800 may be performed by master node 110-1. In another example implementation, some or all of process 800 may be performed by another node or group of nodes separate from, or in combination with master node 110-1.

As shown in FIG. 8, process 800 may include receiving a request to perform a modified one-step synchronization operation using a modified sync packet (block 805) and transmitting a response granting the request to perform the modified one-step synchronization operation (block 810). For example, master node 110-1 may receive a request, from slave node 110-2, to perform a modified one-step synchronization operation using a modified sync packet. The request to perform the modified two-step synchronization operation may be transmitted to master node 110-1 via a delay request set up packet that indicates that slave node 110-2 is capable of performing the modified one-step synchronization operation using the modified sync packet. Master node 110-1 may, in response to the request, generate a delay response set up packet that indicates that the modified one-step synchronization operation is to be performed. Master node 110-1 may transmit the delay response set up packet to slave node 110-2.

If, however, master node 110-1 is not configured to perform the modified one-step synchronization operation using the modified follow-up packet, master node 110-1 may transmit another response packet that indicates that the modified one-step synchronization operation is not to be performed and/or that another synchronization operation is to be performed.

As also shown in FIG. 8, process 800 may include receiving a delay request packet and generating information associated with a delay response packet (block 815). For example, slave node 110-2 may receive the delay response set up packet and may generate a delay request packet. Slave node 110-2 may transmit the delay request packet to master node 110-1 and may temporarily store a time at which the delay request packet was transmitted. Master node 110-1 may receive the delay request packet and may temporarily store another time at which the delay request packet was received.

Master node 110-1 may, in response to receiving the delay request packet, generate information associated with the delay response packet. The information associated with the delay response packet may include a time at which the delay request packet was received.

As further shown in FIG. 8, process 800 may include generating a sync packet and appending, to the sync packet, information associated with the delay response packet (block 820). For example, master node 110-1 may generate a sync packet and may, in a manner similar to that described above (e.g., with respect to block 655 of FIG. 6), append the information, associated with the delay As yet further shown in FIG. 8, process 800 may include transmitting the sync packet (block 825). For example, master node 110-1 may transmit, to slave node 110-2, the sync packet in a manner that includes appending a timestamp to the sync packet. The timestamp may correspond to a time at which the sync packet is transmitted to slave node 110-2.

Slave node 110-2 may receive the sync packet may remove, from the sync packet, the timestamp and/or the information associated with delay response packet. Slave node 110-2 may, in a manner similar to that described above (e.g., with respect to block 640 of FIG. 6) use the timestamp and/or the information associated with the delay response packet to correct a clock that is hosted by slave node 110-2.

Systems and/or methods described herein may enable a modified two-step synchronization operation to be performed in a manner that does not include transmitting a follow-up packet associated with a sync packet. The systems and/or methods may include appending all or a portion of information associated with a follow-up packet, that corresponds to a previous sync packet, to a sync packet for transmission to a slave node.

In another example implementation, the systems and/or methods, described herein, may enable a modified two-step synchronization operation to be performed in a manner that does not include transmitting a delay response packet in response to a delay request packet received from a slave node. The systems and/or methods may include appending, in response to the delay request packet, all or a portion of information associated with a delay response packet, to a follow-up packet for transmission to a slave node. Performing the modified two-step synchronization operation in a manner that does not include the follow-up packet and/or the delay response packet may reduce a quantity of packets that are sent over a network when performing two-step synchronization operations. Additionally, performing the modified two-step synchronization operation in a manner that does not include the follow-up packet and/or the delay response packet may reduce a quantity of bandwidth and/or processing capacity used when performing the two-step synchronization operations.

The foregoing description of implementations provides illustration and description, but is not intended to be exhaustive or to limit the implementations to the precise form disclosed. Modifications and variations are possible in light of the above teachings or may be acquired from practice of the invention.

For example, while series of blocks have been described with regard to FIGS. 4 and 6, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   transmitting, by a first node and to a second node, a first packet that includes a request to perform a modified two-step synchronization operation,
   the modified two-step synchronization operation permitting the first node to calibrate a first clock, hosted by the first node, to a second clock hosted by the second node;
   receiving, by the first node and from the second node, a second packet that includes an indication of granting of the request by the second node;
   receiving, by the first node and from the second node, a third packet;
   determining, by the first node and based on the third packet, a quantity of delay associated with traffic that is being transported from the second node to the first node; and
   calibrating, by the first node, the first clock based on the quantity of delay.

2. The method of claim 1,
   where the first node is a slave node,
   where the second node is a master node, and
   where the third packet includes a synchronization timestamp that identifies a prior point in time when a preceding synchronization packet was transmitted by the second node to the first node.

3. The method of claim 1, where determining the quantity of delay comprises:
   determining a first point in time based on the third packet,
   receiving a fourth packet,
   determining a second point in time based on the fourth packet, and
   determining the quantity of delay based on the first point in time and the second point in time.

4. The method of claim 1, where determining the quantity of delay comprises:
   determining a first point in time when the third packet was received by the first node,
   determining a second point in time when the third packet was transmitted by the second node to the first node, and
   determining the quantity of delay based on the first point in time and the second point in time.

5. The method of claim 4, where determining the quantity of delay comprises:
   determining a difference between the first point in time and the second point in time, and
   determining the quantity of delay based on the difference between the first point in time and the second point in time.

6. The method of claim 1, further comprising:
   determining another quantity of delay based on other traffic being transported from the first node to the second node,
   calibrating the first clock being further based on the other quantity of delay.

7. A non-transitory computer-readable medium storing instructions, the instructions comprising:
   one or more instructions that, when executed by at least one processor of a first node, cause the at least one processor to:
   transmit, to a second node, a first packet that includes a request to perform a modified two-step synchronization operation;
   receive a second packet from the second node;

determine a point in time based on the second packet;
identify a quantity of delay associated with traffic that is being transported from the second node to the first node based on the point in time; and
correct, based on the quantity of delay, a first clock hosted by the first node relative to a second clock hosted by the second node.

8. The non-transitory computer-readable medium of claim 7, where the instructions further comprise:
one or more instructions that, when executed by the at least one processor, cause the at least one processor to:
receive, before receiving the second packet and from the second node, a response that indicates that the modified two-step synchronization operation is to be performed.

9. The non-transitory computer-readable medium of claim 7,
where the second packet includes a time-length-value (TLV) field, and
where the TLV field includes a timestamp that identifies the point in time.

10. The non-transitory computer-readable medium of claim 7, where the point in time identifies when a previous synchronization packet was transmitted by the second node to the first node.

11. The non-transitory computer-readable medium of claim 7, where the one or more instructions to identify the quantity of delay include:
one or more instructions that, when executed by the at least one processor, cause the at least one processor to:
determine another point in time when a previous synchronization packet was received by the first node, and
identify the quantity of delay based on the point in time and the other point in time.

12. The non-transitory computer-readable medium of claim 7, where the one or more instructions to identify the quantity of delay include:
one or more instructions that, when executed by the at least one processor, cause the at least one processor to:
receive a third packet,
determine, based on the third packet, another point in time when the second packet was transmitted by the second node to the first node,
the other point in time identifying when the second packet was received by the first node, and
identify the quantity of delay based on the point in time and the other point in time.

13. The non-transitory computer-readable medium of claim 7, where the instructions to correct the first clock comprise:
one or more instructions that, when executed by the at least one processor, cause the at least one processor to:
identify another quantity of delay associated with traffic that is being transported from the first node to the second node, and
correct the first clock based on the quantity of delay and the other quantity of delay.

14. The non-transitory computer-readable medium of claim 7, where the instructions to correct the first clock comprise:
one or more instructions that, when executed by the at least one processor, cause the at least one processor to:
transmit a delay request packet to the second node,
receive a delay response packet that includes information associated with a time when the delay request packet was received by the second node,
identify another quantity of delay based on the time when the delay request packet was received, and
correct the first clock based on the quantity of delay and the other quantity of delay.

15. A first node comprising:
one or more processors to:
receive a first packet from a second node;
determine, based on the first packet, a first quantity of delay;
receive a second packet from the second node;
determine, based on the second packet, a second quantity of delay associated with traffic that is being transported from the second node to the first node;
identify a particular quantity based on the first quantity of delay and the second quantity of delay; and
use the particular quantity to correct a time associated with a first clock, of the first node, relative to a second clock of the second node.

16. The first node of claim 15, where the first quantity of delay is associated with traffic that is being transported from the first node to the second node.

17. The first node of claim 15,
where the one or more processors are to:
transmit a delay request packet to the second node,
the first packet being a response to the delay request packet, and
the first packet including information identifying a point in time when the delay request packet was received by the second node, and
where, when determining the first quantity of delay, the one or more processors are to:
determine the first quantity of delay based on the point in time.

18. The first node of claim 15, where, when determining the second quantity of delay, the one or more processors are to:
determine a first point in time when the second packet was transmitted by the second node,
determine a second point in time when the second packet was received by the first node, and
determine the second quantity of delay based on the first point in time and the second point in time.

19. The first node of claim 15, where, when determining the second quantity of delay, the one or more processors are to:
determine, based on the second packet, a point in time when a previous synchronization packet was received by the first node, and
determine the second quantity of delay based on the point in time.

20. The first node of claim 15, where the one or more processors are to:
transmit, to the second node, a request to perform a modified two-step synchronization operation; and
receive, before correcting the time associated with the first clock, an indication that the modified two-step synchronization operation is to be performed.

* * * * *